United States Patent
Mizunashi et al.

(10) Patent No.: US 10,351,703 B2
(45) Date of Patent: Jul. 16, 2019

(54) CURABLE ORGANOSILICON RESIN COMPOSITION

(71) Applicant: SHIN-ETSU CHEMICAL CO., LTD., Tokyo (JP)

(72) Inventors: Tomoyuki Mizunashi, Annaka (JP); Yuusuke Takamizawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/608,151

(22) Filed: May 30, 2017

(65) Prior Publication Data

US 2018/0009984 A1    Jan. 11, 2018

(30) Foreign Application Priority Data

Jul. 8, 2016    (JP) .................. 2016-135652

(51) Int. Cl.
| | |
|---|---|
| *C08L 83/06* | (2006.01) |
| *C08G 77/06* | (2006.01) |
| *C08G 77/14* | (2006.01) |
| *C08G 77/42* | (2006.01) |
| *C09K 11/59* | (2006.01) |
| *C08K 5/17* | (2006.01) |
| *C09D 183/06* | (2006.01) |
| *C08G 77/16* | (2006.01) |
| *C08G 77/18* | (2006.01) |
| *C08L 83/00* | (2006.01) |
| *C08G 77/00* | (2006.01) |
| *C09K 11/02* | (2006.01) |

(52) U.S. Cl.
CPC .............. *C08L 83/06* (2013.01); *C08G 77/06* (2013.01); *C08G 77/14* (2013.01); *C08G 77/16* (2013.01); *C08G 77/18* (2013.01); *C08G 77/42* (2013.01); *C08G 77/70* (2013.01); *C08G 77/80* (2013.01); *C08K 5/17* (2013.01); *C08L 83/00* (2013.01); *C09D 183/06* (2013.01); *C09K 11/02* (2013.01); *C09K 11/59* (2013.01); *C08K 2201/00* (2013.01)

(58) Field of Classification Search
CPC .................. C08L 83/04; C08L 83/06
USPC ....................................... 524/588
See application file for complete search history.

(56) References Cited

U.S. PATENT DOCUMENTS

| | | | |
|---|---|---|---|
| 2005/0244659 A1 | 11/2005 | Higuchi et al. | |
| 2007/0099009 A1 | 5/2007 | Shimizu et al. | |
| 2009/0306263 A1 | 12/2009 | Taguchi et al. | |
| 2013/0245187 A1* | 9/2013 | Swier .................. | C08G 77/14 524/500 |
| 2015/0087771 A1* | 3/2015 | Horstman ............ | C09D 183/10 524/588 |
| 2015/0240057 A1 | 8/2015 | Kumar et al. | |
| 2015/0353733 A1 | 12/2015 | Tsutsumi et al. | |
| 2016/0340549 A1* | 11/2016 | Takashima .......... | C08L 83/04 |

FOREIGN PATENT DOCUMENTS

| | | |
|---|---|---|
| EP | 1591503 A1 | 11/2005 |
| JP | 2007-119569 A | 5/2007 |
| JP | 2011-219729 A | 11/2011 |
| JP | 2012-082361 A | 4/2012 |
| JP | 2015-165035 A | 9/2015 |
| JP | 2016-8246 A | 1/2016 |
| JP | 2017-095603 A | 6/2017 |
| WO | WO 2015/111229 * | 7/2015 |

OTHER PUBLICATIONS

Dec. 12, 2017 extended Search Report issued in European Patent Application No. 17001063.1.
Apr. 2, 2019 Office Action Issued in Japanese Patent Application No. 2016-135652.

* cited by examiner

*Primary Examiner* — Marc S Zimmer
(74) *Attorney, Agent, or Firm* — Oliff PLC

(57) ABSTRACT

A curable organosilicon resin composition includes; (A) an organopolysiloxane having a resin structure containing 10 to 60 mol % of an $R^1SiO_{3/2}$ unit, 30 to 80 mol % of an $(R^2)_2SiO_{2/2}$ unit, and 1 to 30 mol % of an $(R^3)_3SiO_{1/2}$ unit. At least a part of the $(R^2)_2SiO_{2/2}$ unit is in continuous repeating units with the average number of the repeating units being 3 to 80. The organopolysiloxane has a weight average molecular weight of 5,000 to 50,000; the amount of the hydroxy groups bonded to silicon atoms is 0.001 to 1.0 mol/100 g; and the amount of the alkoxy groups, each having 1 to 10 carbon atoms, bonded to silicon atoms is 1.0 mol/100 g or less. A curable organosilicon resin composition has excellent workability, can give a cured product rapidly, and can make the cured product excellent in mechanical properties, heat resistance, crack resistance, and adhesive property, the surface tackiness being suppressed.

8 Claims, No Drawings

CURABLE ORGANOSILICON RESIN COMPOSITION

TECHNICAL FIELD

The present invention relates to a curable organosilicon resin composition.

BACKGROUND ART

Until now, a condensation-curable polyorganosiloxane has been widely used for an adhesive, water-proof and moisture-proof coating material, electrical insulator film, encapsulating material for architecture, etc. In recent years, use for an encapsulating material of a light emitting diode (LED) has attracted attention from the viewpoint of high heat resistance, light resistance, and transparency thereof. A condensation-curable organopolysiloxane, however, has lower reactivity and thus poor productivity compared with an addition-curable polyorganosiloxane. There is a problem that the silicone resin cannot exhibit an inherent high heat resistance and light resistance since a large amount of condensation catalyst for enhancing the reactivity accelerates the deterioration of the silicone resin. In addition, some catalysts are unsuitable for a field requiring transparency since they have a color themselves or exhibit a color due to the deterioration.

So far, many attempts have been made to improve and utilize a condensation-curable polyorganosiloxane. For example, Patent Literature 1 attempts to minimize the deterioration of a resin while enhancing the curing rate by adding, besides a metal catalyst such as aluminum or zinc, a condensation catalyst such as a phosphate ester or a boron compound to a polyorganosiloxane having two or more silanol groups per molecule and a polyorganosiloxane having two or more silicon-bonded alkoxy groups per molecule. In addition, as described in Patent Literature 2, there has been an attempt to decrease catalyst remained in a cured product by adding a volatile amine catalyst to cure partially hydrolyzed tetraalkoxysilane or trialkoxysilane and linear polyorganosiloxane containing silanol groups at the both terminals. Further, as described in Patent Literature 3, there also has been an attempt previously increasing the molecular weight of a condensable polyorganosiloxane to reduce the number of reaction for gelation.

CITATION LIST

Patent Literature

Patent Literature 1: Japanese Unexamined Patent Application publication (Kokai) No. 2011-219729
Patent Literature 2: Japanese Unexamined Patent Application publication (Kokai) No. 2016-8246
Patent Literature 3: Japanese Unexamined Patent Application publication (Kokai) No. 2007-119569

SUMMARY OF INVENTION

Technical Problem

However, curable organosilicon resin compositions as described above are not satisfactory for a field requiring high heat resistance and light resistance.

For example, in the curable organosilicon resin composition described in Patent Literature 1, a large amount of catalyst is contained in the cured product to lower the heat resistance and light resistance, and excess amount of alkoxy groups are contained to evolve gas due to the bi-product of the reaction during the curing, causing voids. In the resin composition of Patent Literature 2, the amine catalyst catalyzes condensation even at lower temperature, thereby changing the viscosity largely to cause problems of can-stability and handling properties. In production of a thick cured product, the amine catalyst does not volatile sufficiently, and the remained amine catalyst is deteriorated by heat to change the color of the cured product to brown. In Patent Literature 3, the higher molecular weight causes higher viscosity, which is inappropriate to the use for curing after casting into a concave portion.

The present invention was accomplished in view of the above-described problems. It is an object of the present invention to provide a curable organosilicon resin composition that has excellent workability, can give a cured product rapidly, and can make the cured product be excellent in mechanical properties, heat resistance, crack resistance, and adhesive property with the surface tackiness being suppressed.

Solution to Problem

To solve the foregoing problems, the present invention provides a curable organosilicon resin composition comprising;

(A) an organopolysiloxane having a resin structure comprising 10 to 60 mol % of an $R^1SiO_{3/2}$ unit, 30 to 80 mol % of an $(R^2)_2SiO_{2/2}$ unit, and 1 to 30 mol % of an $(R^3)_3SiO_{1/2}$ unit, wherein at least a part of the $(R^2)_2SiO_{2/2}$ unit is in continuous repeating units with the average number of the repeating units being 3 to 80, wherein each of $R^1$ and $R^3$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms; each $R^2$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms, and among the whole $R^2$s, 40 to 100 mol % is a methyl group;

the organopolysiloxane has a weight average molecular weight of 5,000 to 50,000;

the amount of the hydroxy groups bonded to silicon atoms of the organopolysiloxane is 0.001 to 1.0 mol/100 g; and the amount of the alkoxy groups, each having 1 to 10 carbon atoms, bonded to silicon atoms of the organopolysiloxane is 1.0 mol/100 g or less.

Such a curable organosilicon resin composition has excellent workability, can give a cured product rapidly, and can make the cured product be excellent in mechanical properties, heat resistance, crack resistance, and adhesive property with the surface tackiness being suppressed.

It is preferable that the organopolysiloxane do not contain an alkoxy group.

In such a curable organosilicon resin composition, it is possible to further decrease the gases evolved in curing.

It is preferable that the curable organosilicon resin composition further comprise a condensation catalyst as a component (B).

In the inventive curable organosilicon resin composition, it is possible to use any catalyst to catalyze condensation reaction to convert a hydroxy group bonded to a silicon atom of an organosiloxane into a siloxane bond.

It is also preferable that the curable organosilicon resin composition further comprise an organosilicon compound shown by the following formula (1) or its ring-opening polymer as a component (C),

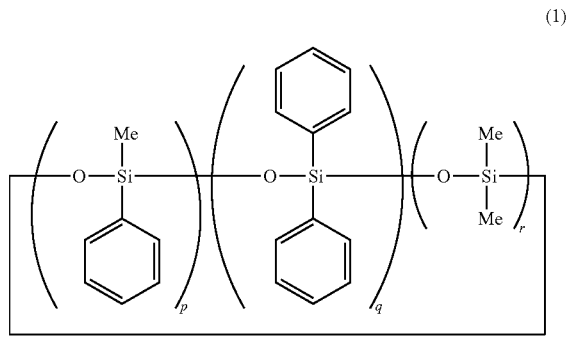

(1)

wherein "p", "q", and "r" each represents an integer of 0 to 4, and p+q+r=3 or 4.

A composition with lower viscosity can be easily obtained by containing such a component (C).

It is also preferable that the curable organosilicon resin composition further comprise a fluorescent substance as a component (D).

The inventive curable organosilicon resin composition gives a cured product having an excellent heat resistance and so on, thereby being free from the risk of causing serious lowering of fluorescent property, which has been occurred previously, even when it contains a fluorescent substance.

It is also preferable that the curable organosilicon resin composition is in a liquid state at 25° C.

Such a curable organosilicon resin composition excels in workability much more.

Advantageous Effects of Invention

The inventive curable organosilicon resin composition has fluidity and excels in workability thereby. The inventive composition can decrease gases evolved in curing, and can form a cured product rapidly. The inventive composition can give a cured product that is excellent in mechanical properties, heat resistance, crack resistance, adhesive property, transparency, and light resistance. The inventive composition can also give a cured product with the surface tackiness being suppressed.

DESCRIPTION OF EMBODIMENTS

Hereinafter, the present invention will be described more specifically.

As described above, it has been demanded for a curable organosilicon resin composition that has excellent workability, can give a cured product rapidly, and can make the cured product be excellent in mechanical properties, heat resistance, crack resistance, and adhesive property with the surface tackiness being suppressed.

The present inventors have diligently studied to accomplish the foregoing subjects and consequently found that the foregoing subjects can be solved by using a curable organosilicon resin composition comprising an organopolysiloxane in which each of the molecular weight, the amount of hydroxy group, and the amount of alkoxy group is in a certain range; thereby brought the present invention to completion.

Hereinafter, the present invention will be specifically described, but the present invention is not limited thereto. In this description, Me, Vi, and Ph represent a methyl group, a vinyl group, and a phenyl group respectively.

<Curable Organosilicon Resin Composition>

The inventive curable organosilicon resin composition comprises (A) an organopolysiloxane having a resin structure comprising 10 to 60 mol % of an $R^1SiO_{3/2}$ unit, 30 to 80 mol % of an $(R^2)_2SiO_{2/2}$ unit, and 1 to 30 mol % of an $(R^3)_3SiO_{1/2}$ unit, wherein at least a part of the $(R^2)_2SiO_{2/2}$ unit is in continuous repeating units with the average number of the repeating units being 3 to 80, wherein each of $R^1$ and $R^3$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms; each $R^2$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms, and among the whole $R^2$s, 40 to 100 mol % is a methyl group;

the organopolysiloxane has a weight average molecular weight of 5,000 to 50,000;

the amount of the hydroxy groups bonded to silicon atoms of the organopolysiloxane is 0.001 to 1.0 mol/100 g; and the amount of the alkoxy groups, each having 1 to 10 carbon atoms, bonded to silicon atoms of the organopolysiloxane is 1.0 mol/100 g or less.

Hereinafter, each component of the inventive curable organosilicon resin composition will be described.

[(A) Organopolysiloxane]

The organopolysiloxane of the component (A) contained in the inventive curable organosilicon resin composition is an organopolysiloxane comprising 10 to 60 mol % of an $R^1SiO_{3/2}$ unit (T unit), 30 to 80 mol % of an $(R^2)_2SiO_{2/2}$ unit (D unit), and 1 to 30 mol % of an $(R^3)_3SiO_{1/2}$ unit (M unit); and is a block polymer having a resin structure in which at least a part of the $(R^2)_2SiO_{2/2}$ unit is in continuous repeating units with the average number of the repeating units being 3 to 80. When the ratio of the T unit is less than 10 mol %, the cured product tends to be brittle, and the surface tackiness of the cured product can get higher. When the ratio of the T unit is more than 60 mol %, the cured product is liable to lose the elongation to cause cracks. When the ratio of the D unit is less than 30 mol %, the cured product is liable to lose the elongation to cause cracks. When the ratio of the D unit is more than 80 mol %, the cured product tends to be brittle, and the surface tackiness of the cured product can get higher. When the ratio of the M unit is less than 1 mol %, the molecular weight is liable to increase to lower the fluidity. When the ratio of the M unit is more than 30 mol %, the resin tends to lose the strength. When the number of the repeating D units is less than 3, the resin tends to lose the strength. When the number of the repeating D units is more than 80, the molecular weight is liable to increase to lower the fluidity. Incidentally, the average number of the repeating $(R^2)_2SiO_{2/2}$ units refers to a value measured by $^{29}$Si-NMR.

Each of $R^1$ to $R^3$ in the M unit, D unit, and T unit independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms. Provided that 40 to 100 mol % of the whole $R^2$s is a methyl group. When the ratio of a methyl group in the whole $R^2$s is less than 40 mol %, the curing can be slow due to steric hindrance of the substituents.

Illustrative examples of the alkyl group having 1 to 10 carbon atoms include lower alkyl groups such as a methyl group, an ethyl group, a propyl group, and a butyl group. As described above, the number of carbon atoms of the alkyl group is preferably 1 to 6. Illustrative examples of the aryl group having 6 to 10 carbon atoms include a phenyl group, a tolyl group, and a xylyl group. Illustrative examples of the alkoxy group having 1 to 10 carbon atoms include a methoxy group, an ethoxy group, a propoxy group, and a butoxy group. They can also be groups with the hydrogen atom being partly or totally substituted with a halogen atom(s) such as fluorine, bromine, and chlorine, or a cyano group(s), including a chloromethyl group, a cyanoethyl group, and a 3,3,3-trifluoropropyl group, for example. Among them, a methyl group and a phenyl group are preferable.

The organopolysiloxane of the component (A) has a weight average molecular weight (Mw) of 5,000 to 50,000, preferably 6,000 to 40,000. When the molecular weight is less than 5,000, there arises a risk of failing to cure the composition. When the molecular weight is more than 50,000, the composition can be a solid to lose the fluidity.

Incidentally, the weight average molecular weight (Mw) in the present invention refers to a weight average molecular weight measured by gel permeation chromatography (GPC) under the following conditions in terms of polystyrene standard.

[Measurement Conditions]
Eluent: tetrahydrofuran (THF)
Flow rate: 0.6 mL/min
Detector: Differential refractive index detector (RI)
Column: TSK Guard column Super H-L
TSK gel Super H4000 (6.0 mm I.D.×15 cm×1)
TSK gel Super H3000 (6.0 mm I.D.×15 cm×1)
TSK gel Super H2000 (6.0 mm I.D.×15 cm×2)
(each of them produced by Tosoh Corporation)
Column temperature: 40° C.
Sample injection amount: 20 μL (a THF solution in a concentration of 0.5% by mass)

The organopolysiloxane of the component (A) has the hydroxyl group bonded to a silicon atom in an amount of 0.001 to 1.0 mol/100 g, preferably 0.005 to 0.8 mol/100 g, more preferably 0.01 to 0.6 mol/100 g. When the amount of the hydroxy groups bonded to silicon atoms is less than 0.001 mol/100 g, there arises a risk of failing to cure the composition due to the few crosslinking points. When the amount of the hydroxy groups bonded to silicon atoms is more than 1.0 mol/100 g, the cured surface is liable to absorb dust due to surface tackiness.

In the organopolysiloxane of the component (A), the amount of the silicon-bonded alkoxy groups having 1 to 10 carbon atoms is 1.0 mol/100 g or less, preferably 0.01 mol/100 g or less; and it is desirable that an alkoxy group is not contained. When the amount of the alkoxy group is more than 1.0 mol/100 g, alcohol gas of the by-product tends to be evolved in curing to leave voids in a cured product. In the present invention, the amount of the hydroxy groups and the amount of the alkoxy groups, each of the groups being bonded to a silicon atom, refers to values measured by $^1$H-NMR and $^{29}$Si-NMR.

Illustrative examples of material to give an $R^1SiO_{3/2}$ unit (T unit) include organosilicon compounds such as organotrichlorosilane and organotrialkoxysilane shown by the following structural formulae, together with condensation reaction products thereof, but not limited thereto.

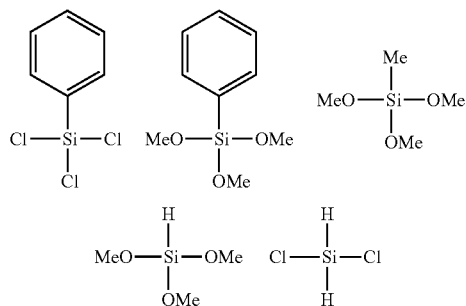

Illustrative examples of material to give an $(R^2)_2SiO_{2/2}$ unit (D unit) include organosilicon compounds such as diorganodichlorosilane and diorganodialkoxysilane shown by the following structural formulae, but not limited thereto.

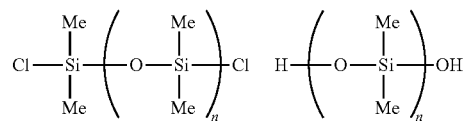

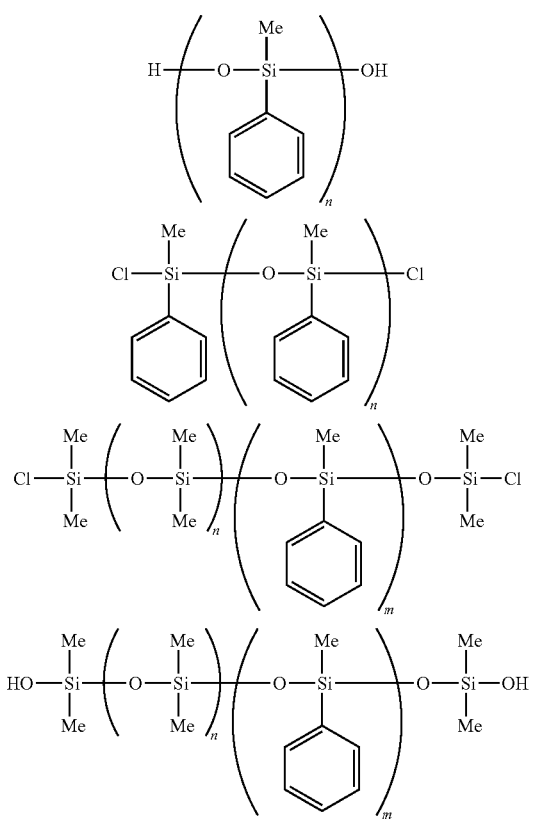

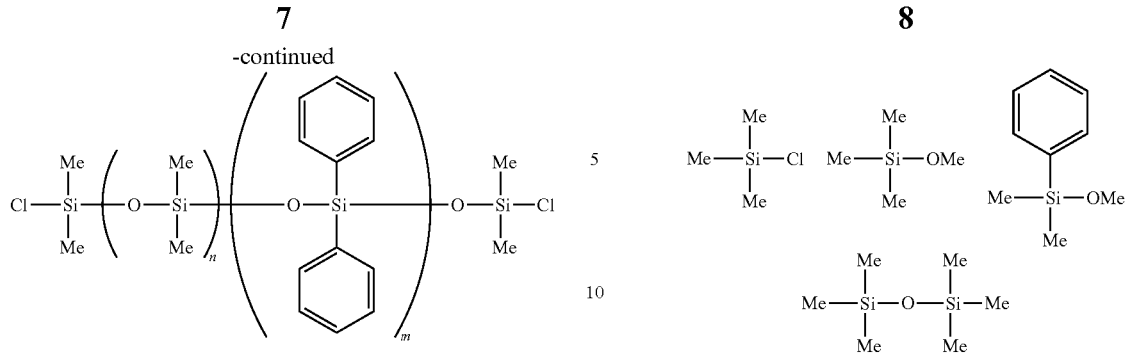

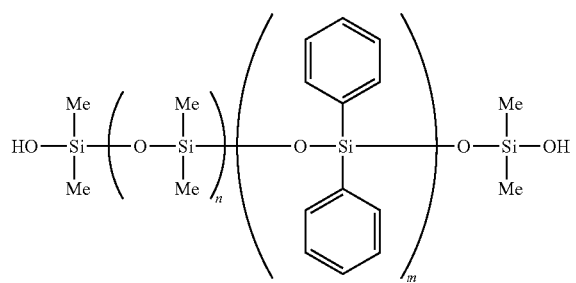

In the foregoing formulae, "n" represents an integer of 5 to 80, and "m" represents an integer of 5 to 80. Provided that n+m≤78. Organopolysiloxane having continued D units can be easily synthesized by using a material to give D unit having continued siloxane bonds as described above. It is to be noted that the materials to give D unit may be the following.

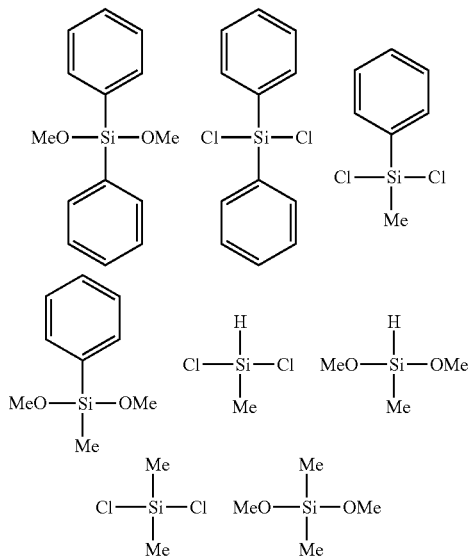

Illustrative examples of material to give an $(R^3)_3SiO_{1/2}$ unit (M unit) include organosilicon compounds such as triorganochlorosilane, triorganoalkoxysilane, and hexaorganodisiloxane shown by the following formulae, but not limited thereto.

The organopolysiloxane of the component (A) can be synthesized by combining the foregoing materials of respective units so as to have a desired molar ratio and performing co-hydrolysis and condensation reaction thereof in the presence of acid, for example. In the course of this reaction, hydroxy groups bonded to silicon atoms (silanol groups) are formed as a by-product. Accordingly, the obtained organopolysiloxane can have silicon-bonded hydroxy groups (and silicon-bonded alkoxy groups) in an amount within the range of the present invention by adjusting the conditions of this reaction (e.g., reaction temperature, reaction time) appropriately. It is to be noted that illustrative examples of the method for obtaining organopolysiloxane without an alkoxy group include a method of using a material without containing an alkoxy group as the raw material for each component, a method of performing co-hydrolysis reaction until all of the alkoxy groups contained in the raw material of each unit become silanol groups, etc.

[(B) Condensation Catalyst]

The inventive curable organosilicon resin composition may further contain a condensation catalyst as a component (B). As this condensation catalyst, it is possible to use any catalyst that catalyzes a condensation reaction to convert silicon-bonded hydroxy groups of organosiloxane into a siloxane bond(s).

The condensation catalyst is not particularly limited and can be an amine compound or metal compounds of zirconium, titanium, tin, zinc, iron, etc. Illustrative examples of the amine compound include primary alkylamines such as methylamine, ethylamine, n-propylamine, isopropylamine, n-butylamine, isobutylamine, t-butylamine, n-pentylamine, neopentylamine, n-hexylamine, cyclopropylamine, and cyclohexylamine; secondary alkylamines such as dimethylamine, diethylamine, di-n-propylamine, diisopropylamine, diisopropylethylamine, di-n-butylamine, methylethylamine, methylpropylamine, ethylpropylamine, methylisobutylamine, diisobutylamine, di-t-butylamine, and methylpentylamine; tertiary alkylamines such as triethylamine, tri-n-propylamine, tri-n-butylamine, N-ethyldipropylamine, tributylamine, and trihexylamine; silazane, and polysilazane. Illustrative examples of the metal compound include alkoxide and carboxlato complexes of lead, tin, zinc, iron, zirconium, titanium, cerium, calcium, and barium; and silicates of alkaline metal such as lithium silicate, sodium silicate, and potassium silicate. Among them, amine compounds such as di-n-butylamine, N-ethyldipropylamine, tri-n-butylamine, silazane, and polysilazane; metal compounds including alkoxide and carboxlato complexes of tin, zinc, zirconium, and calcium; and silicates of alkaline metal such as lithium silicate, sodium silicate, and potassium silicate are preferable. The amount of the condensation catalyst to be added is preferably 0.1 to 5% by mass, more preferably 0.5 to 3% by mass based on the total amount of the curable organosilicon resin composition.

[(C) Organosilicon Compound]

The inventive curable organosilicon resin composition can further contain an organosilicon compound shown by the following formula (1) or its ring-opening polymer as a component (C). Herein, "p", "q", and "r" each represents an integer of 0 to 4, and p+q+r=3 or 4.

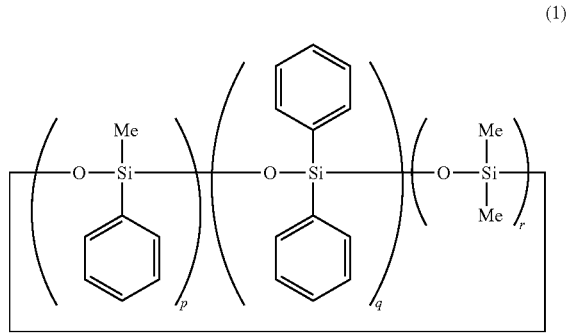

The organosilicon compound shown by the formula (1) is in a solid state at a normal temperature, but it can easily undergo ring-opening to give liquid state ring-opening polymer by reacting with an amine compound or a metal compound of zirconium, titanium, tin, zinc, iron, etc. described above as the condensation catalyst. The organosilicon compound shown by the formula (1) becomes liquid by mixing with the component (A) followed by heating and mixing at a temperature of 50 to 200° C. Accordingly, the composition with low viscosity can be easily obtained by containing such a component (C).

The amount of this organosilicon compound to be added is preferably 0.1 to 30% by mass, more preferably 0.2 to 20% by mass based on the whole curable organosilicon resin composition.

[(D) Fluorescent Substance]

The inventive curable organosilicon resin composition may further contain a fluorescent substance as a component (D). The inventive curable organosilicon resin composition gives a cured product having excellent heat resistance and light resistance, thereby being free from the risk of causing serious lowering of fluorescent property, which has been occurred previously, even when it contains a fluorescent substance.

The inventive curable organosilicon resin composition can contain any known adhesion promoter and/or additive in addition to the components (A) to (D), if needed. Illustrative examples of the adhesion promoter include phenyltrimethoxysilane, trimethoxysilane, triethoxysilane, methyldimethoxysilane, diphenyldimethoxysilane, methylphenyldimethoxysilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-methacryloxypropylmethyldiethoxysilane, 3-methacryloxypropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, 3-mercaptopropyltrimethoxysilane, 3-isocyanatopropyltrimethoxysilane, 3-cyanopropyltrimethoxysilane, and oligomers thereof. These adhesion promoters can be added alone or in combination of two or more kinds. The adhesion promoter is preferably added in an amount of 0 to 10% by mass, particularly 0 to 5% by mass relative to the total mass of the components (A) and (B).

Illustrative examples of the additive include reinforcing inorganic fillers such as silica, glass fiber, and fumed silica; non-reinforcing inorganic fillers such as calcium carbonate, calcium silicate, titanium dioxide, ferric oxide, carbon black, and zinc oxide; and nano-fillers of silicon dioxide (silica: $SiO_2$), zirconium oxide (zirconia: $ZrO_2$), titanium oxide ($TiO_2$), aluminum oxide (alumina: $Al_2O_3$), zinc oxide (ZnO), iron oxide ($FeO_2$), triiron tetraoxide ($Fe_3O_4$), lead oxide ($PbO_2$), tin oxide ($SnO_2$), cerium oxides ($Ce_2O_3$, $CeO_2$), calcium oxide (CaO), trimanganese tetraoxide ($Mn_3O_4$), magnesium oxide (MgO), barium oxide (BaO), etc. They can be formulated optionally in an amount of 600 parts by mass or less (e.g., 0 to 600 parts by mass, generally 1 to 600 parts by mass, preferably 10 to 400 parts by mass) per a total of 100 parts by mass of the components (A) to (D).

It is also preferable that the inventive curable organosilicon resin composition is in a liquid state at 25° C. Such a curable organosilicon resin composition excels in workability much more.

The inventive curable organosilicon resin composition can be applied to a prescribed substrate in accordance with the use and then cured. As a curing condition, it is possible to cure sufficiently at a normal temperature (25° C.), but it is also possible to perform heating to cure, if needed. When heating, the temperature may be set to 60 to 200° C., for example.

The inventive curable organosilicon resin composition preferably gives a cured product with a direct light transmittance of 70% or more, particularly 80% or more at a wavelength of 400 to 800 nm, particularly 450 nm when cured by heating to a thickness of 1 mm. Incidentally, in a measurement of a direct light transmittance, it is possible to use spectrophotometer U-4100 manufactured by Hitachi, Ltd., for example.

The inventive curable organosilicon resin composition preferably gives a cured product with a refractive index of 1.4 to 1.7 when cured by heating.

The composition which gives a cured product having such a direct light transmittance or a refractive index has superior transparency, and therefore it can be preferably used for optical uses such as an encapsulant for LED.

The inventive curable organosilicon resin composition described above has fluidity and excels in workability thereby. The inventive composition can decrease gases evolved in curing, and can give a cured product rapidly. The inventive composition can give a cured product that is excellent in mechanical properties, heat resistance, crack resistance, adhesive property, transparency, and light resistance. The inventive composition can also give a cured product with the surface tackiness being suppressed.

<Semiconductor Apparatus>

The present invention can also provide a semiconductor apparatus in which a semiconductor device is encapsulated with a cured product of the inventive curable organosilicon resin composition described above.

As described above, the inventive curable organosilicon resin composition gives a cured product with excellent transparency and heat resistance. Accordingly, the inventive composition is suitable for a lens material, a protective coating material, a molding material, etc. for a light emitting semiconductor apparatus, and is particularly useful for encapsulating LED devices such as blue LED, white LED, ultraviolet LED, etc. Moreover, the inventive curable organosilicon resin composition has excellent heat resistance, and therefore it can provide a light emitting semiconductor apparatus which can secure long-time reliability under high humidity and has excellent moisture resistance and long-time color rendering property even when used as a material for a wavelength conversion film by adding a silicate based fluorescent substance or a quantum dot fluorescent substance.

In encapsulating a light emitting semiconductor device such as LED with the inventive curable organosilicon resin composition, for example, it is possible to encapsulate an LED device with a cured product of the inventive curable organosilicon resin composition by applying the inventive curable organosilicon resin composition onto an LED device mounted on a pre-mold package made of thermoplastic resin, followed by curing the composition on the LED device. It is also possible to apply the composition onto an LED device in a state of varnish prepared by dissolving the composition to an organic solvent such as toluene or xylene.

The inventive curable organosilicon resin composition has excellent properties such as heat resistance, ultraviolet resistance, transparency, crack resistance, and long-time reliability. Accordingly, the inventive curable organosilicon resin composition is an optimum material for optical uses such as display material, optical memory media material, optical apparatus material, optical parts material, optical fiber material, photofunctional-electronfunctional organic material, and peripheral materials for semiconductor integrated circuit.

EXAMPLES

Hereinafter, the present invention will be explained more specifically by showing Examples and Comparative Examples, but the present invention is not limited to the following Examples. It is to be noted that the parts represents a parts by mass. The properties of organopolysiloxane used in the following Examples and Comparative Examples are shown in Table 1, including the ratios of each unit, the weight average molecular weight, the amount of hydroxy groups, the amount of alkoxy groups, and the average number of D units continued therein.

Example 1

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (provided that part of the substituents of the polysiloxane was a hydroxy group(s) or an alkoxy group(s), as in the following) in which Mw=10,000, the amount of hydroxy groups bonded to silicon atoms=0.8 mol/100 g, the amount of alkoxy groups having 1 to 10 carbon atoms bonded to silicon atoms (hereinafter, referred to as an amount of alkoxy groups bonded to silicon atoms)=0.8 mol/100 g, and the average number of $Me_2SiO_{2/2}$ units continued therein=20; together with tributyl amine as the component (B) in the amount of 0.5% by mass based on the total mass. The properties of this composition and the curing product thereof were measured by the following methods. The results are shown in Table 2.

Example 2

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=50,000, the amount of hydroxy groups bonded to silicon atoms=0.02 mol/100 g, the amount of alkoxy groups bonded to silicon atoms=0 mol/100 g, and the average number of $Me_2SiO_{2/2}$ units continued therein=80); together with tributyl amine as the component (B) in the amount of 0.5% by mass based on the total mass. The properties of this composition and the curing product thereof were measured by the following methods. The results are shown in Table 2.

Example 3

A curable organosilicon resin composition was prepared by adding 100 parts of branched phenylmethylpolysiloxane as the component (A), composed of 50 mol % of a $PhSiO_{3/2}$ unit, 30 mol % of a $Me_2SiO_{2/2}$ unit, 10 mol % of a $PhMeSiO_{2/2}$ unit, and 10 mol % of a $Me_3SiO_{1/2}$ unit (Mw=5,000, the amount of hydroxy groups bonded to silicon atoms=1.0 mol/100 g, the amount of alkoxy groups bonded to silicon atoms=0 mol/100 g, and the average number of $(R^2)_2SiO_{2/2}$ units continued therein=5); together with tributyl amine as the component (B) in the amount of 0.5% by mass based on the total mass. The properties of this composition and the curing product thereof were measured by the following methods. The results are shown in Table 2.

Example 4

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=10,000, the amount of hydroxy groups bonded to silicon atoms=1.0 mol/100 g, the amount of alkoxy groups bonded to silicon atoms=0 mol/100 g, and the average number of $Me_2SiO_{2/2}$ units continued therein=30); tributyl amine as the component (B) in the amount of 0.5% by mass based on the total mass; and the organosilicon compound shown by the following formula (2) as the component (C)

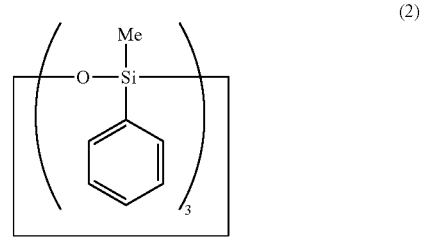

(2)

in the amount of 10% by mass based on the total mass. The properties of this composition and the curing product thereof were measured by the following methods. The results are shown in Table 2.

Example 5

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=12,000, the amount of hydroxy groups bonded to silicon atoms=1.0 mol/100 g, the amount of alkoxy groups bonded to silicon atoms=0 mol/100 g, and the average number of $Me_2SiO_{2/2}$ units continued therein=40); together with a mixture as the component (C) that was added after confirming that the solid state organosilicon compound shown by the following formula (3) became liquid state by mixing the organosilicon compound shown by the formula (3) and tributyl amine in the ratio of 5:1

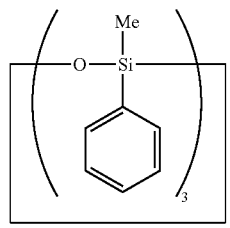

(3)

in the amount of 10% by mass based on the total mass. The properties of this composition and the curing product thereof were measured by the following methods. The results are shown in Table 2.

Example 6

A curable organosilicon resin composition was prepared in the same manner as Example 2 except for changing the component (A) used in Example 2 to have an amount of hydroxy groups bonded to silicon atoms of 0.001 mol/100 g and a weight average molecular weight of 40,000. The properties of this composition and the curing product thereof were measured by the following methods. The results are shown in Table 2.

Comparative Example 1

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=53,000, the amount of hydroxy groups bonded to silicon atoms=0.5 mol/100 g, the amount of alkoxy groups bonded to silicon atoms=0.5 mol/100 g, and the average number of $Me_2SiO_{2/2}$ units continued therein=90); together with tributyl amine as the component (B) in the amount of 0.5% by mass based on the total mass. The properties of this composition and the curing product thereof were measured by the following methods. The results are shown in Table 3.

Comparative Example 2

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=4,500, the amount of hydroxy groups bonded to silicon atoms=0.5 mol/100 g, the amount of alkoxy groups bonded to silicon atoms=0.5 mol/100 g, and the average number of $Me_2SiO_{2/2}$ units continued therein=4); together with tributyl amine as the component (B) in the amount of 0.5% by mass based on the total mass. The properties of this composition and the curing product thereof were measured by the following methods. The results are shown in Table 3.

Comparative Example 3

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=25,000, the amount of hydroxy groups bonded to silicon atoms=1.2 mol/100 g, the amount of alkoxy groups bonded to silicon atoms=0.05 mol/100 g, and the average number of $Me_2SiO_{2/2}$ units continued therein=60); together with tributyl amine as the component (B) in the amount of 0.5% by mass based on the total mass. The properties of this composition and the curing product thereof were measured by the following methods. The results are shown in Table 3.

Comparative Example 4

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=15,000, the amount of hydroxy groups bonded to silicon atoms=0.0005 mol/100 g, the amount of alkoxy groups bonded to silicon atoms=0.05 mol/100 g, and the average number of $Me_2SiO_{2/2}$ units continued therein=70); together with tributyl amine as the component (B) in the amount of 0.5% by mass based on the total mass. The properties of this composition and the curing product thereof were measured by the following methods. The results are shown in Table 3.

Comparative Example 5

A curable organosilicon resin composition was prepared by adding 100 parts of branched phenylmethylpolysiloxane as the component (A), composed of 50 mol % of a $PhSiO_{3/2}$ unit, 40 mol % of a $Me_2SiO_{2/2}$ unit, and 10 mol % of a $Me_3SiO_{1/2}$ unit (Mw=15,000, the amount of hydroxy groups bonded to silicon atoms=0.7 mol/100 g, the amount of alkoxy groups bonded to silicon atoms=1.2 mol/100 g, and the average number of $Me_2SiO_{2/2}$ units continued therein=70); together with tributyl amine as the component (B) in the amount of 0.5% by mass based on the total mass. The properties of this composition and the curing product thereof were measured by the following methods. The results are shown in Table 3.

Comparative Example 6

A curable organosilicon resin composition was prepared by adding 100 parts of branched phenylmethylpolysiloxane as the component (A), composed of 5 mol % of a $PhSiO_{3/2}$ unit, 85 mol % of a $PhMeSiO_{2/2}$ unit, and 10 mol % of a $Me_3SiO_{1/2}$ unit (Mw=10,000, the amount of hydroxy groups bonded to silicon atoms=0.05 mol/100 g, the amount of alkoxy groups bonded to silicon atoms=0.01 mol/100 g, and the average number of $PhMeSiO_{2/2}$ units continued therein=30); together with tributyl amine as the component (B) in the amount of 0.5% by mass based on the total mass. The properties of this composition and the curing product thereof were measured by the following methods. The results are shown in Table 3.

Comparative Example 7

A curable organosilicon resin composition was prepared by adding 100 parts of branched phenylmethylpolysiloxane as the component (A), composed of 70 mol % of a $PhSiO_{3/2}$ unit, 20 mol % of a $PhMeSiO_{2/2}$ unit, and 10 mol % of a $Me_3SiO_{1/2}$ unit (Mw=10,000, the amount of hydroxy groups bonded to silicon atoms=0.05 mol/100 g, the amount of alkoxy groups bonded to silicon atoms=0.02 mol/100 g, and the average number of $PhMeSiO_{2/2}$ units continued therein=1.5); together with tributyl amine as the component (B) in the amount of 0.5% by mass based on the total mass. The properties of this composition and the curing product thereof were measured by the following methods. The results are shown in Table 3.

Comparative Example 8

A curable organosilicon resin composition was prepared by adding 100 parts of branched phenylmethylpolysiloxane as the component (A), composed of 80 mol % of a $PhSiO_{3/2}$ unit, 10 mol % of a $Me_2SiO_{2/2}$ unit, and 10 mol % of a $Me_3SiO_{1/2}$ unit (Mw=10,000, the amount of hydroxy groups bonded to silicon atoms=0.06 mol/100 g, the amount of alkoxy groups bonded to silicon atoms=0.03 mol/100 g, and the average number of $Me_2SiO_{2/2}$ units continued therein=6); together with tributyl amine as the component (B) in the amount of 0.5% by mass based on the total mass. The properties of this composition and the curing product thereof were measured by the following methods. The results are shown in Table 3.

Comparative Example 9

An addition curing type silicone rubber composition was prepared by adding 100 parts of branched vinylphenylmethylpolysiloxane as the component (A), composed of 60 mol % of a $PhSiO_{3/2}$ unit, 30 mol % of a $PhMeSiO_{2/2}$ unit, and 10 mol % of a $ViMe_2SiO_{1/2}$ unit (Mw=4,000, the amount of hydroxy groups bonded to silicon atoms=0.05 mol/100 g, the amount of alkoxy groups bonded to silicon atoms=0.02 mol/100 g, and the average number of $PhMeSiO_{2/2}$ units continued therein=5); organohydrogenpolysiloxane as a component (E), shown by the following formula

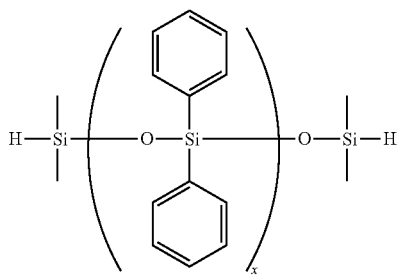

(wherein, x=1)
in the amount to have an SiH/SiVi ratio of 1.0; and 0.05 parts of an octyl alcohol solution of chloroplatinic acid (content of platinum element: 2% by mass) as a component (F); followed by well stirring. The properties of this composition and the curing product thereof were measured by the following methods. The results are shown in Table 3.

The properties of the compositions prepared in Examples and Comparative Examples and the cured products thereof were measured by the following methods.

(1) Appearance

The color and the transparency of the cured product (the thickness of 1 mm) obtained by curing each composition at 150° C. for 4 hours were visually observed.

(2) Property

The fluidity of each composition before curing was determined. Into a 100 ml of glass vial, 50 g of each composition was introduced. The glass vial was laid down to be left at 25° C. for 10 minutes. It was judged as liquid when the composition started to flow during that period.

(3) Refractive Index

The refractive index at 589 nm, 25° C. of the cured product obtained by curing each composition at 150° C. for 4 hours was measured with an Abbe refractometer based on JIS K 7142:2008.

(4) Hardness (Type A)

The hardness of the cured product obtained by curing each composition at 150° C. for 4 hours was measured with a durometer A hardness tester based on JIS K 6249:2003.

(5) Elongation at Break and Tensile Strength

The elongation at break and the tensile strength of the cured product obtained by curing each composition at 150° C. for 4 hours were measured based on JIS K 6249:2003.

(6) Heat Resistance (Light Transmittance Retention Ratio) and Crack Resistance

The light transmittance at a wavelength of 450 nm of the cured product (the thickness of 1 mm) obtained by curing each composition at 150° C. for 4 hours was measured at 23° C. with a Hitachi spectrophotometer U-4100 (initial transmittance). Then, the cured product was subjected to heat treatment at 200° C. for 1,000 hours, followed by measuring the light transmittance in the same way to determine the light transmittance after the heat-treatment relative to the initial transmittance (100%). In addition, whether a crack exists or not was observed visually in each cured product after the heat treatment.

(7) Adhesive Property

Onto a silver plate with an area of 180 $mm^2$, 0.25 g of each composition was molded so as to have the base area of 45 $mm^2$, followed by curing at 150° C. for 4 hours. Subsequently, the cured product was broken with a micro spatula, and when it was removed from the silver plate, the ratio of a part of cohesive failure and a part of peeling was determined to evaluate the adhesive property.

(Evaluation Criteria)
Good: the ratio of cohesive failure was 60% or more
Bad: the ratio of cohesive failure was less than 60%

(8) Dust Adhesion Due to Surface Tackiness

On the surface of the cured product obtained by curing each composition at 150° C. for 4 hours, whether dust adhesion exist or not was observed visually.

TABLE 1

|  | Examples | | | | | |
|---|---|---|---|---|---|---|
|  | 1 | 2 | 3 | 4 | 5 | 6 |
| T unit (mol %) | 50 | 50 | 50 | 50 | 50 | 50 |
| D unit (mol %) | 40 | 40 | 40 | 40 | 40 | 40 |
| M unit (mol %) | 10 | 10 | 10 | 10 | 10 | 10 |
| Mw | 10,000 | 50,000 | 5,000 | 10,000 | 12,000 | 40,000 |
| Amount of hydroxy group (mol/100 g) | 0.8 | 0.02 | 1.0 | 1.0 | 1.0 | 0.001 |
| Amount of alkoxy group (mol/100 g) | 0.8 | 0 | 0 | 0 | 0 | 0 |
| Average number of D units continued | 20 | 80 | 5 | 30 | 40 | 80 |

|  | Comparative Examples | | | | | |
|---|---|---|---|---|---|---|
|  | 1 | 2 | 3 | 4 | 5 | 6 |
| T unit (mol %) | 50 | 50 | 50 | 50 | 50 | 5 |
| D unit (mol %) | 40 | 40 | 40 | 40 | 40 | 85 |
| M unit (mol %) | 10 | 10 | 10 | 10 | 10 | 10 |
| Mw | 53,000 | 4,500 | 25,000 | 15,000 | 15,000 | 10,000 |
| Amount of hydroxy group (mol/100 g) | 0.5 | 0.5 | 1.2 | 0.0005 | 0.7 | 0.05 |
| Amount of alkoxy group (mol/100 g) | 0.5 | 0.5 | 0.05 | 0.05 | 1.2 | 0.01 |
| Average number of D units continued | 90 | 4 | 60 | 70 | 70 | 30 |

|  | Comparative Examples | | |
|---|---|---|---|
|  | 7 | 8 | 9 |
| T unit (mol %) | 70 | 80 | 60 |
| D unit (mol %) | 20 | 10 | 30 |
| M unit (mol %) | 10 | 10 | 10 |
| Mw | 10,000 | 10,000 | 4,000 |
| Amount of hydroxy group (mol/100 g) | 0.05 | 0.06 | 0.05 |
| Amount of alkoxy group (mol/100 g) | 0.02 | 0.03 | 0.02 |
| Average number of D units continued | 1.5 | 6 | 5 |

TABLE 2

|  | Examples | | | | | |
|---|---|---|---|---|---|---|
|  | 1 | 2 | 3 | 4 | 5 | 6 |
| Appearance | Colorless, transparent | Colorless, transparent | Colorless, transparent | Colorless, transparent | Colorless, transparent | Colorless, transparent |
| Property | Liquid | Liquid | Liquid | Liquid | Liquid | Liquid |
| Refractive index | 1.5 | 1.5 | 1.52 | 1.5 | 1.5 | 1.5 |
| Hardness (type A) 150° C. × 4 h | 80 | 88 | 72 | 71 | 75 | 85 |
| Elongation at break (%) | 70 | 60 | 83 | 85 | 73 | 72 |
| Tensile strength (MPa) | 3 | 4 | 2 | 2 | 2 | 3 |
| Light transmittance (%, initial) | 95 | 95 | 95 | 85 | 95 | 95 |
| Light transmittance (%, after heat treatment) | 92 | 91 | 92 | 82 | 92 | 93 |
| Dust adhesion due to surface tackiness | None | None | None | None | None | None |
| Crack resistance | No crack | No crack | No crack | No crack | No crack | No crack |
| Adhesive property (Ag) | Good | Good | Good | Good | Good | Good |

TABLE 3

| | Comparative Examples | | | | |
|---|---|---|---|---|---|
| | 1 | 2 | 3 | 4 | 5 |
| Appearance | Colorless, transparent | Colorless, transparent | Colorless, transparent | Colorless, transparent | Colorless, transparent |
| Property | Solid | Liquid | Liquid | Liquid | Liquid |
| Refractive index | 1.5 | 1.5 | 1.5 | — | 1.5 |
| Hardness (type A) 150° C. × 4 h | 80 | 30 | 72 | Not cured | 75 (void evolved) |
| Elongation at break (%) | 70 | 20 | 83 | — | 73 |
| Tensile strength (MPa) | 3 | 0.5 | 2 | — | 2 |
| Light transmittance (%, initial) | 95 | 95 | 95 | — | 95 |
| Light transmittance (%, after heat treatment) | 92 | 91 | 92 | — | 92 |
| Dust adhesion due to surface tackiness | None | None | Exist | — | None |
| Crack resistance | No crack | No crack | No crack | — | Cracked |
| Adhesive property (Ag) | Good | Good | Good | — | Good |

| | Comparative Examples | | | |
|---|---|---|---|---|
| | 6 | 7 | 8 | 9 |
| Appearance | Colorless, transparent | Colorless, transparent | Colorless, transparent | Colorless, transparent |
| Property | Liquid | Liquid | Liquid | Liquid |
| Refractive index | 1.5 | 1.56 | 1.53 | 1.53 |
| Hardness (type A) 150° C. × 4 h | 10 | 90 | 95 | 75 |
| Elongation at break (%) | 30 | 5 | 5 | 70 |
| Tensile strength (MPa) | 0.1 | 6 | 10 | 2 |
| Light transmittance (%, initial) | 95 | 95 | 98 | 98 |
| Light transmittance (%, after heat treatment) | 91 | 92 | 90 | 70 |
| Dust adhesion due to surface tackiness | Exist | None | None | None |
| Crack resistance | Cracked | Cracked | Cracked | Cracked |
| Adhesive property (Ag) | Good | Bad | Good | Good |

As shown in Table 2, Examples 1 to 6, which are the inventive curable organosilicon resin composition, gave nearly transparent cured products with sufficient hardness, elongation at break, and tensile strength, as well as excellent refractive index, heat resistance, crack resistance, and adhesive property, and being free from dust adhesion due to surface tackiness. In Examples 1 to 6, each component had fluidity, thereby having excellent workability, and could give a cured product rapidly.

On the other hand, in Comparative Example 1 using the organopolysiloxane with the molecular weight more than 50,000 and the average number of $(R^2)_2SiO_{2/2}$ units continued therein was over 80 as the component (A), the composition became solid state even before curing, and the workability got worse.

In Comparative Example 2 using the organopolysiloxane with the molecular weight less than 5,000 as the component (A), the cured product showed insufficient hardness and was inferior to Examples 1 to 6 in strength.

In Comparative Example 3 using the organopolysiloxane with the amount of hydroxy groups bonded to silicon atoms being more than 1.0 mol/100 g as the component (A), the composition had surface tackiness.

In Comparative Example 4 using the organopolysiloxane with the amount of hydroxy groups bonded to silicon atoms being less than 0.001 mol/100 g as the component (A), the curing was not proceeded.

In Comparative Example 5 using the organopolysiloxane with the amount of alkoxy groups bonded to silicon atoms being more than 1.0 mol/100 g as the component (A), there occurred voids during the curing, causing cracks start from the voids.

Comparative Example 6, in which the ratio of $R'SiO_{3/2}$ unit was less than 10 mol %, and the ratio of $(R^2)_2SiO_{2/2}$ unit was more than 80 mol %, gave a brittle cured product of the resin composition having surface tackiness.

Comparative Example 7, in which the average number of $(R^2)_2SiO_{2/2}$ units continued was less than 3, the ratio of $R'SiO_{3/2}$ unit was more than 60 mol %, and the ratio of $(R^2)_2SiO_{2/2}$ unit was less than 30 mol %, gave a cured product of the resin composition having insufficient elongation and cracks formed therein. In Comparative Example 7, the adhesive property was also bad.

Comparative Example 8, in which the ratio of $R'SiO_{3/2}$ unit was more than 60 mol %, and the ratio of $(R^2)_2SiO_{2/2}$ unit was less than 30 mol %, gave a cured product of the resin composition having insufficient elongation and cracks formed therein.

In Comparative Example 9 using an addition curing type silicone rubber composition that contains an organopolysiloxane with the molecular weight less than 5,000, the heat resistance was inferior to Examples 1 to 6.

As described above, the inventive curable organosilicon resin composition has fluidity and excels in workability thereby. The inventive composition can form a cured product rapidly. The inventive composition can give a cured product that achieves excellent heat resistance, mechanical properties, crack resistance, and adhesive property. The inventive composition can also give a cured product with the surface tackiness being suppressed.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A curable organosilicon resin composition comprising;
(A) an organopolysiloxane having a resin structure comprising 10 to 60 mol % of an $R^1SiO_{3/2}$ unit, 30 to 80 mol % of an $(R^2)_2SiO_{2/2}$ unit, and 1 to 30 mol % of an $(R^3)_3SiO_{1/2}$ unit, wherein at least a part of the $(R^2)_2SiO_{2/2}$ unit is in continuous repeating units with the average number of the repeating units being 3 to 80,
wherein each of $R^1$ and $R^3$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms; each $R^2$ independently represents any of a hydrogen atom, a hydroxy group, a substituted or unsubstituted alkyl group having 1 to 10 carbon atoms, a substituted or unsubstituted aryl group having 6 to 10 carbon atoms, and a substituted or unsubstituted alkoxy group having 1 to 10 carbon atoms, and among the whole $R^2$s, 40 to 100 mol % is a methyl group;

the organopolysiloxane has a weight average molecular weight of 5,000 to 50,000;

the amount of the hydroxy groups bonded to silicon atoms of the organopolysiloxane is 0.001 to 1.0 mol/100 g; and the amount of the alkoxy groups, each having 1 to 10 carbon atoms, bonded to silicon atoms of the organopolysiloxane is 1.0 mol/100 g or less;

further comprising an organosilicon compound shown by the following formula (1), or its ring-opening polymer as a component (C),

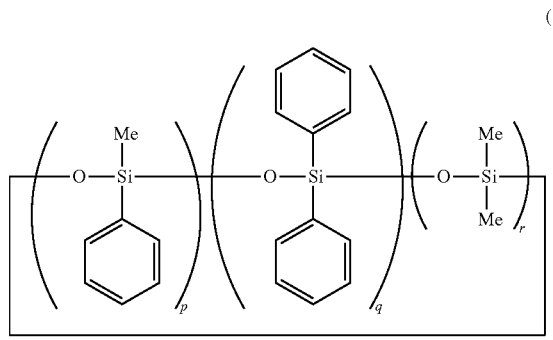

(1)

wherein "p", "q", and "r" each represents an integer of 0 to 4, and p+q+r=3 or 4;

wherein the curable organosilicon resin composition is in a liquid state at 25° C.

2. The curable organosilicon resin composition according to claim 1, wherein the organopolysiloxane does not contain an alkoxy group.

3. The curable organosilicon resin composition according to claim 1, further comprising a condensation catalyst as a component (B).

4. The curable organosilicon resin composition according to claim 2, further comprising a condensation catalyst as a component (B).

5. The curable organosilicon resin composition according to claim 1, further comprising a fluorescent substance as a component (D).

6. The curable organosilicon resin composition according to claim 2, further comprising a fluorescent substance as a component (D).

7. The curable organosilicon resin composition according to claim 3, further comprising a fluorescent substance as a component (D).

8. The curable organosilicon resin composition according to claim 4, further comprising a fluorescent substance as a component (D).

* * * * *